NONRETURN VALVES

Original Filed July 30, 1968 3 Sheets-Sheet 1

NONRETURN VALVES

Original Filed July 30, 1968 3 Sheets-Sheet 3

United States Patent Office

Re. 27,399
Reissued June 20, 1972

27,399
NONRETURN VALVES

Nicola D'Urso, Turin, Italy, assignor to A.M.I.S. Apparecchi E Macchine Idrauliche Speciali S.p.A., Turin, Italy Original No. 3,556,138, dated Jan. 19, 1971, Ser. No. 748,801, July 30, 1968. Application for reissue May 19, 1971, Ser. No. 145,073
Int. Cl. F16k *15/00*
U.S. Cl. 137—512.15 6 Claims

Matter enclosed in heavy brackets [ ] appears in the original patent but forms no part of this reissue specification; matter printed in italics indicates the additions made by reissue.

ABSTRACT OF THE DISCLOSURE

A nonreturn valve for liquids has a tapered end formed by flexible inclined walls terminating in a slit which is defined between two flexible lips. A continuous raised rib is formed on the internal surface of one of the lips and makes linear sealing contact with a corresponding [force] *face* of the other lip inwardly of the slit effectively to cut off flow through the slit upon closure of the valve.

This invention relates to nonreturn valves.

Nonreturn valves are known comprising two mutually inclined wall portions of flexible polymeric composition, for example, rubber, provided with a pair of flexible lips forming a transversely extending slit, the two lips being in mutual sealing contact, closing the slit, when the fluid pressure externally of the slit exceeds that within the said wall portions, thereby preventing fluid backflow through the said slit.

Valves of this type are known, for example, through French Pat. Nos. 348,834 and 1,109,095 and U.S. Pat. No. 2,662,724.

The invention relates more specifically to such valves for controlling the flow of liquids, more particularly liquids having in suspension therein solid particles which are present either accidentally or deliberately. For such liquids, valves of the above-mentioned known type are of limited usefulness, owing to a large number of drawbacks.

For example, attempts were made to improve the efficiency and reliability of such valves. In practice, however, valves of the known type have a tendency to leak which is greater the lower the back pressure acting on the valve. Also, both with high and low back pressures valves of the above-mentioned type leak if solid particles such as sand, metal particles, or the like are trapped between the lips, even if the lips have contact surfaces which are extensive in a longitudinal direction, that is, in the direction of flow, since such particles unavoidably give rise to leakage paths.

Consequently, nonreturn valves of this type are in practice unsuitable for use in precisely the fields for which they were supposed theoretically to have advantages with respect to other types, that is, for use with liquids containing solid particles.

The above drawbacks may be mitigated by limiting the diametrical width of the slit between the lips as compared with the diameter of the valve inlet, or by applying to the lips additional resilient forces, for example, by means of external springs, in order to further assist closure of the valve. However, such arrangements limit the opening of the slit when the latter is expanded by forward flow of liquid, so that the valve presents an undesirable flow restriction, and the supply pressure has to be increased to maintain a given rate of flow through the valve. Increasing the linear velocity of suspension or slurry through the valve slit, however, increases the abrasive action of the solid particles on the internal faces of the lips, so that after a relatively short period of use the valve is no longer able to seal effectively against backward pressure, whether this be large or small.

An object of the invention is to provide a nonreturn valve of the above defined type, which is practically free from the above described drawbacks, that is, a valve which is capable of effecting an excellent seal against back pressure without the addition of external springs and without unduly limiting the diametrical width of the slit between the lips.

In the nonreturn valve according to the present invention a continuous rib is formed on the internal surface of one of the lips and is adapted to make substantially linear sealing contact with a corresponding face, adapted to receive said rib, on the internal surface of the other lip, inwardly of the slit defining edges of the lips. Preferably, the said linear sealing contact is of the "knife edge" type, the rib being of a wedge-shaped transverse cross-sectional profile.

It is understood that the efficiency of the nonreturn valve according to the invention arises from the ability of the rib to interrupt on closure of the valve the continuity of the liquid film covering the smooth internal surface of the other lip; more particularly, when the rib has a wedge-shaped transverse profile it is wedged without difficulty between any solid particles in the liquid and "incises" the said liquid film until it breaks the continuity thereof over the entire width of the slit. Once this has happened, leakage of liquid backwardly through the valve, even in the complete absence of an inlet pressure, becomes extremely improbable, as has been found from a large number of tests carried out under various conditions.

In order that the invention may be more clearly understood, particular embodiments will be described, by way of example only, with reference to the accompanying drawings, in which.

Figure 1:
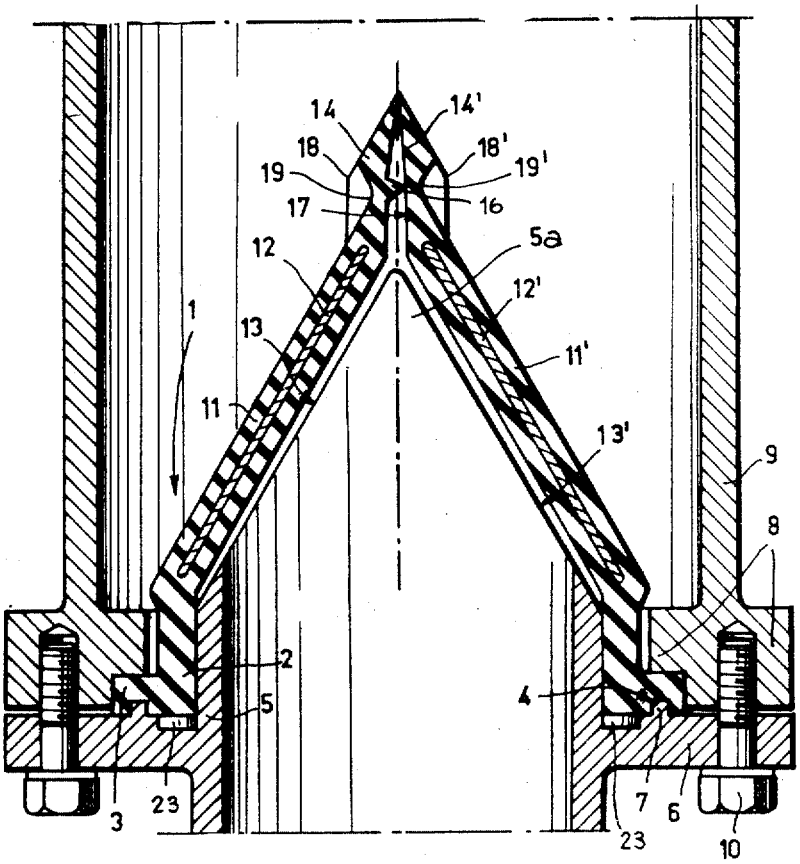
FIG. 1 is an axial sectional view of a valve according to one embodiment of the invention, illustrated at the moment of establishing sealing contact between the valve lips.

Referring to the drawings, a hollow valve member 1 is made of a flexible polymeric composition, such as rubber. The member 1 is provided at its inlet end with a tubular inlet portion 2 having an external annular flange 3, adapted to be fitted coaxially on a tubular inlet member 5 which is in turn provided externally with an integral or separately attached annular flange 6.

The flange 3 of the valve member is formed with an annular groove 4 adapted to fit over an annular projection 7 carried by the flange 6 on the inlet member 5 to effect sealing.

A tubular outlet member 9 surrounds the valve member 1. The outlet member 9 is provided with an annular flange 8 which is connectable to the said flange 6 on the inlet member 5 by means of bolts 10, the flange 3 of the valve member 1 being clamped between the two flanges 6, 9.

Figure 4:
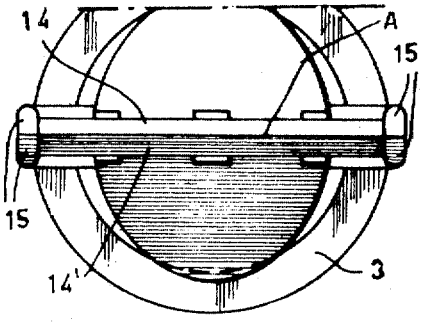
FIG. 4 is a plan view of the valve member in its closed condition.
Figure 5:
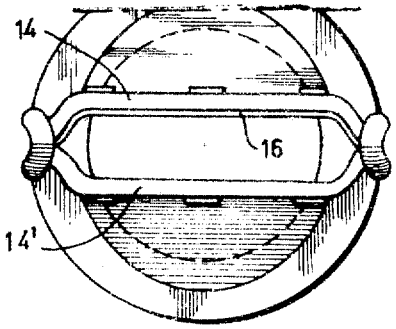
FIG. 5 is a plan view of the valve member with the slit in an intermediate open position.

The valve member 1 comprises, in addition to the above-mentioned tubular inlet portion 2, a flattened tapering outlet end which, in the embodiments shown, comprises two planar wall portions 11, 11', each inclined to the axis of the tubular portion 2 and terminating in a pair of flexible lips 14, 14' forming therebetween a slit A (FIG. 4) extending in a substantially diametrical plane with respect to the tubular inlet portion 2.

The two mutually inclined wall portions 11, 11' incorporate metallic reinforcing elements 12, 12' which improve their rigidity. The wall portions 11, 11' are adapted to bear on opposite end surfaces 13, 13' of a tapered wedge-shaped end of the tubular inlet member 5 which, in the embodiment shown in FIG. 1, is cut symmetrically to form two wedge-shaped end extensions 5a which are disposed within and conform in shape to the wedge-shaped space within the valve member 1.

The bearing of the inclined wall portions 11, 11' of the valve member 1 on the end surfaces 13, 13', together with the stiffening action of the metal reinforcing elements 12, 12', affords a high resistance of the valve to large back pressures, preventing the wall portions 11, 11' from being deformed substantially under excessive back pressure within the outlet member 9.

When the hydraulic pressure within the tubular outlet member 9 exceeds that within the inlet member 5, the two lips 14, 14' are forced together, closing the slit A and establishing mutual sealing contact so that backward flow of the liquid through the slit A is prevented.

According to this invention the internal face of one lip 14 is formed with a continuous rib 16 inwardly of the slit-defining lip contact region and extending throughout the diametrical width of the said slit A. The rib 16 is adapted to come into a substantially linear sealing contact with a corresponding face 17 on the internal surface of the other lip 14', which is devoid of a rib.

The rib 16 is of a wedge-shaped transverse cross-sectional profile and behaves like a knife edge. Thus, upon closure of the valve the rib interrupts the continuity of the liquid film covering the internal faces of the two lips 14, 14' throughout the diametrical width of the slit A. The knife edge profile of the rib 16 further acts to displace any solid particles which may be present in the liquid away from the contacting region of the rib 16 and the face 17, thereby ensuring good sealing at this region. Obviously, once the liquid film has been interrupted in this way, the leakage of liquid backwardly through the valve is rendered extremely improbable, even in the complete absence of fluid pressure in the tubular inlet member 5.

It should be noted that the valve member 1 is of such construction that on fitting over the tubular inlet member 5 it is slightly deformed so that the two inclined wall portions 11, 11', and consequently the lips 14, 14' are prestressed and contact each other even in the absence of fluid pressure in the tubular outlet member 9.

In order to improve the elasticity of the terminal portion of the lips 14, 14', which are in cross section tapered in profile towards their slit-defining contact edges (FIG. 1), the lips 14, 14' are each externally formed with respective regions 19, 19' of reduced thickness inwardly of the said contact edges. External reinforced regions 18, 18' of increased thickness are provided at intervals along the regions 19, 19'. The zones 18, 18' act as abutments and transmit to the lips 14, 14' the closing thrust exerted on the outer surfaces of the wall portions 11, 11' by back pressure in the tubular outlet member 9.

Figure 2:
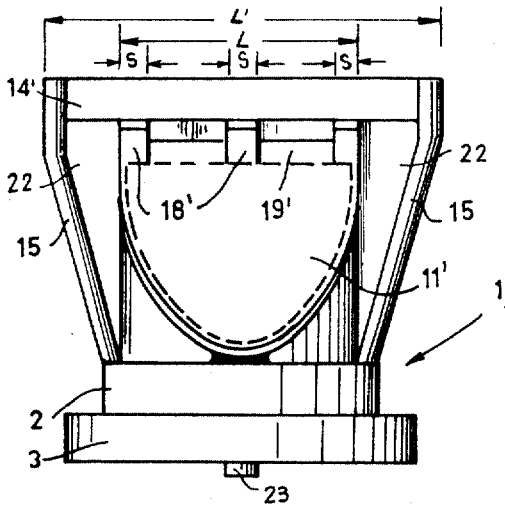
FIG. 2 is a side elevational view of the valve member viewed in a direction perpendicular to the plane of the valve slit.
Figure 3:
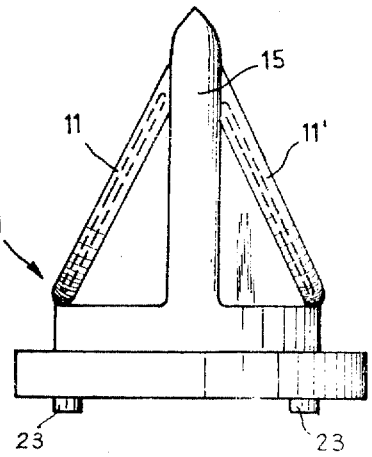
FIG. 3 is a side elevational view of the valve member viewed in the direction of the valve slit.

Normally, each lip 14, 14' is formed with at least three reinforced regions 18, 18' distributed over an intermediate portion of the lip of a length L not exceeding the overall length L' of the lip (FIG. 2). Each reinforced region 18, 18' is of a width S which is smaller than or equal one-sixth of L.

The sum of the lengths of all the various reinforced regions 18, 18' of each lip 14, 14' shall not in any case exceed half the length L of the intermediate portion of the respective lip. This is necessary in order to afford a sufficient expansibility of the lips 14, 14' so that in normal operation at a predetermined feed pressure the valve member 1 expands to afford a minimum restriction to flow and, therefore, maximum delivery, the outlet diameter of the expanded member 1 substantially equaling the diameter of the inlet member 5.

As shown in FIGS. 1 to 5 each of the inclined wall portions 11, 11' is provided on its opposite sides with two flat flexible web portions 22 gradually increasing in width towards the slit A. The web portions 22 interconnect the tubular portion 2 of the valve member 1 and the terminal lips 14, 14'. The web portions 22 are themselves interconnected along their outer edges by integral edge beads 15 of large thickness.

On manufacture the terminal portion of the lip 14 is moulded separately from the corresponding part of the opposite lip 14', the two lips 14, 14' being then interconnected, such as by welding, at respective edge regions 21, 21' in the respective edge beads 15 to avoid any slight curvature of the contact edges defining the slit A, in order to ensure efficient sealing on closure.

Figure 6:
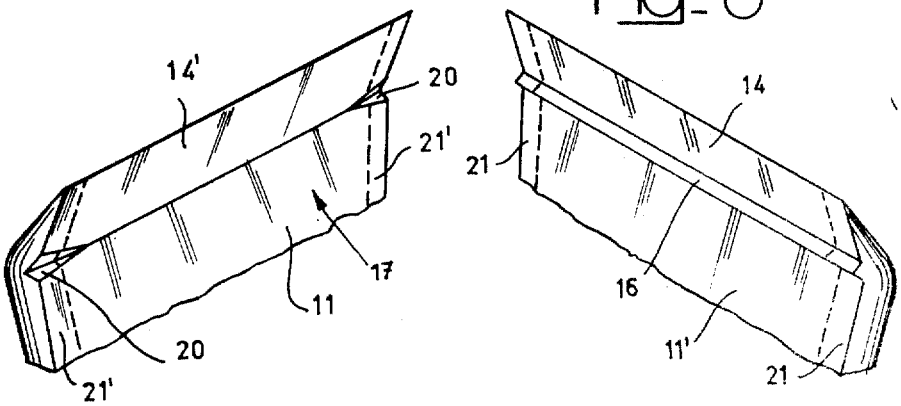
FIG. 6 is a perspective exploded view of the two valve lips showing the mutual welding regions of the latter to the opposite ends of the valve slit.

As shown in FIG. 6, the internal rib-accommodating face 17 of lip 14' is formed at its ends with two shaped notches 20 accommodating the ends of the rib 16 of the other lip 14 upon welding of both lips 14, 14' to each other, to ensure a sealing contact throughout the width of the slit A.

Upon welding the edge regions 21, 21' of the two lips 14, 14' and adjacent parts the valve member 1 is vulcanized to is final shape.

Summarizing, under normal operational conditions internal pressure in the tubular inlet member 5 expands the flattened outlet end of the valve member 1, opening the slit A, while on the occurrence of external pressure, or back pressure, in the tubular outlet member 9 this end is caused to reclose. Upon closure of the valve member 1 sealing contact is initially established between the sharpened end edges of the two lips 14, 14', followed by contact of the knife-shaped rib 16 of the lip 14 with the face 17 of the other lip 14'; this latter contact shears the liquid film between the lips 14, 14' and interrupts the flow of liquid through the slit A.

The external back pressure or, in the absence of such pressure, the prestressed condition of the wall portions 11, 11', maintains the valve in its closed condition normally.

On assembly of the valve a slight clearance should be left in the inoperative (closed) condition of the valve member 1 between the internal faces of the inclined wall portions 11, 11' and the end surfaces 13, 13' of the tubular inlet member 5 in order to admit of a slight bending of the wall portions 11, 11' on closing of the valve under the influence of back pressure.

The end face of the flange 3 of the tubular inlet portion 2 is provided with projections 23 which assist accurate location of the valve member on assembly.

In normal use of the valve with liquid containing solid particles in suspension, solid particles may be deposited around the valve member 1, locking the lips 14, 14' thereof and preventing opening of the lips when a normal liquid flow is established. Such clogging occurs more readily when the valve is mounted vertically with the lips 14, 14' disposed uppermost, as shown on the drawings.

Figure 8:
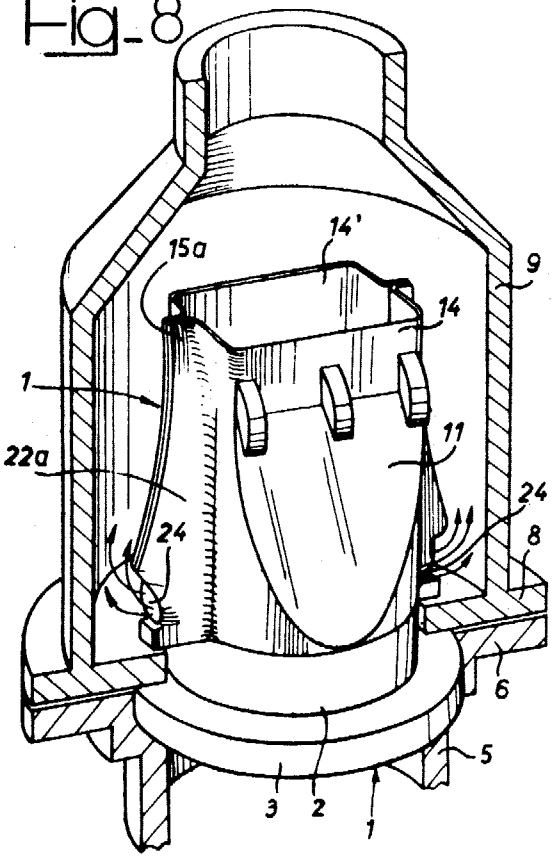
FIG. 8 is a view similar to FIG. 7 showing the modified valve in its open condition.
Figure 7:
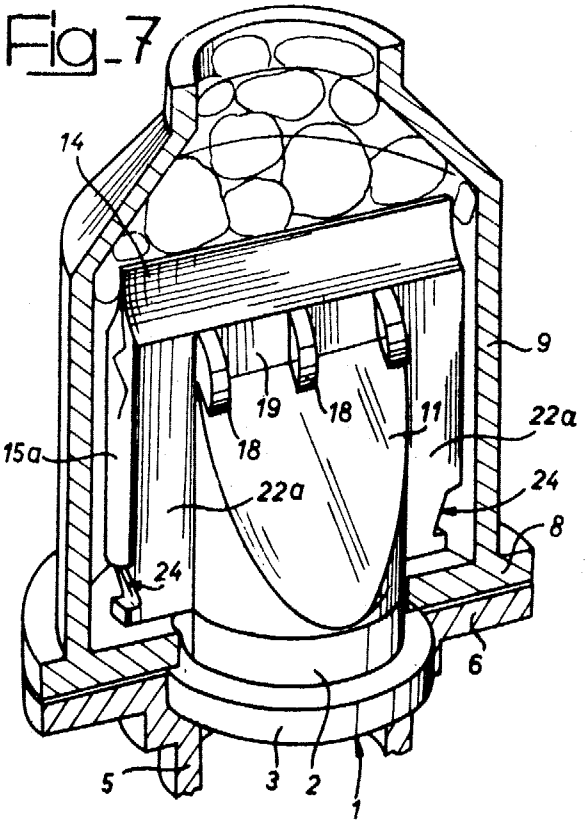
FIG. 7 is a part sectional perspective view of a valve according to a modification of the embodiment of the preceding figures, shown in its closed position.

FIGS. 7 and 8 illustrate a modified construction for obviating this drawback. Two planar web portions 22a extend laterally between the tubular inlet portion 2 of the valve member 1 and the flattened end and are substantially coplanar with the lips 14, 14', the said web portions 22a being interconnected along their outer edges by rounded beads 15a at which the juxtaposed ends of the two lips 14, 14' are welded together, as in the previous embodiment.

Two elongated slitlike outlets 24 are formed symmetrically between the outer edges of the web portions 22a near the inlet end of the valve member 1 and are situated in a diametrical plane, the outlets 24 communicating with the hollow interior of the valve member 1.

Normally, the resiliency of the material from which the valve member 1 is formed holds the outlets 24 closed. However, if opening of the lips 14, 14' is prevented by the deposit of solid particles around the valve walls 11, 11', as described above, the liquid pressure within the valve member 1 causes the outlets 24 to open. Liquid then flows upwardly along the clearance between the outlet member 9 and the valve member 1, bypassing the slit A and gradually removing the solid particles until opening of lips 14, 14' is possible.

The outlets 24 are preferably formed by making slit incisions along the edge beads 15a in proximity to the inlet end of the valve member 1.

I claim:

1. In a nonreturn valve for liquids of the type comprising a hollow valve member of flexible material adapted to be fitted in a flow duct and having a tapering outlet end in the flow path comprising a pair of flexible lips defining a slit which is closed or open in accordance with the relative fluid pressures internally and externally of the valve member, the improvement which comprises a raised rib of substantially wedge-shaped cross section with a sharp edge formed on the internal surface of one of the lips and extending completely across the flexible lip perpendicular to the flow path and a smooth face, adapted to contact said rib, on the internal surface of the other lip, inwardly of the slit-defining edges of the lips, whereby substantially linear sealing contact is established at said rib when the valve is closed.

2. A nonreturn valve for liquids as claimed in claim 1, wherein the valve member includes a tubular inlet portion and flexible wall portions formed integrally with the tubular inlet portion, the flexible lips being provided on the wall portions, and a flexible web portion integral with each wall portion at the edge of the wall portion, the web portions that abut each other along each edge of the wall portions being sealingly interconnected, outlet means being formed between the outer edges of the web portions near the inlet end of the valve member and communicate with the interior thereof, such outlet means being closed resiliently when the valve is closed and being open to afford a slit bypass path in response to the pressure within the valve member when the slit is clogged.

3. Valve according to claim 2, in which the said outlet means comprise respective slit incisions along parts of the interconnected edges of the web portions.

4. A nonreturn valve for liquids as claimed in claim 1 wherein the smooth face of the other lip is provided at its opposite ends with two shaped notches accommodating the ends of the rib.

5. A nonreturn valve as claimed in claim 4 wherein the valve member includes a tubular inlet portion and flexible wall portions formed integrally with the tubular inlet portion, a rigid tubular member is disposed coaxially within the tubular inlet portion of the valve member, the tubular member having a tapered end with end surfaces against which the flexible wall portions are adapted, under the influence of back pressure which tend to close the slit, to bear, each wall portion including a rigid reinforcement in the zone in which it is adapted to bear on the end surface of the rigid tubular member, whereby cooperation between the rigid reinforcement of the wall portions and the tapered end of the tubular member resists deformation of the nonreturn valve when that valve is under the influence of back pressure.

6. A nonreturn valve according to claim 1 wherein the valve member includes a tubular inlet portion and flexible wall portions formed integrally with the tubular inlet portion, a rigid tubular member disposed coaxially within the tubular inlet portion of the valve member, the tubular member having a tapered end with end surfaces against which the flexible wall portions are adapted, under the influence of back pressure which tend to close the slit, to bear, each wall portion including a rigid reinforcement in the zone in which it is adapted to bear on the end surfaces of the rigid tubular member, whereby cooperation between the rigid reinforcement of the wall portions and the tapered end of the tubular member resists deformation of the nonreturn valve when that valve is under the influence of back pressure.

References Cited

The following references, cited by the Examiner, are of record in the patented file of this patent or the original patent.

UNITED STATES PATENTS

| | | | |
|---|---|---|---|
| 1,051,554 | 1/1913 | Champion | 137—525.1 X |
| 2,236,293 | 3/1941 | Lund | 137—525.1 X |
| 2,662,724 | 12/1953 | Kravagna | 137—525.1 |
| 3,104,787 | 9/1963 | Thompson | 137—525.1 X |
| 3,167,089 | 1/1965 | Gordon | 137—525.1 X |
| 3,179,301 | 4/1965 | Lucht | 222—490 X |
| 3,422,844 | 1/1969 | Grise | 137—525.1 |

FOREIGN PATENTS

| | | | |
|---|---|---|---|
| 348,834 | 2/1905 | France | 137—525.1 |
| 19,874 | 1911 | Great Britain | 137—525.1 |
| 602,102 | 5/1948 | Great Britain | 137—525.1 |
| 754,497 | 8/1956 | Great Britain | 137—525.1 |

M. CARY NELSON, Primary Examiner

D. J. ZOBKIW, Assistant Examiner

U.S. Cl. X.R.

137—512.4, 516.25, 525.1

UNITED STATES PATENT OFFICE

CERTIFICATE OF CORRECTION

Patent No. Re 27399 Dated June 20, 1972

Inventor(s) Nicola D'Urso

It is certified that error appears in the above-identified patent and that said Letters Patent are hereby corrected as shown below:

In the Heading, insert the following:

--Claims priority, application Italy, August 5, 1967, 52699-A/67; July 10, 1968, 52384-A/68--

Signed and sealed this 23rd day of January 1973.

(SEAL)
Attest:

EDWARD M.FLETCHER,JR.
Attesting Officer

ROBERT GOTTSCHALK
Commissioner of Patents